(12) United States Patent
Okamoto

(10) Patent No.: US 12,005,778 B2
(45) Date of Patent: Jun. 11, 2024

(54) WORK MACHINE

(71) Applicant: KUBOTA CORPORATION, Osaka (JP)

(72) Inventor: Naoya Okamoto, Sakai (JP)

(73) Assignee: KUBOTA CORPORATION, Osaka (JP)

(*) Notice: Subject to any disclaimer, the term of this patent is extended or adjusted under 35 U.S.C. 154(b) by 0 days.

(21) Appl. No.: 18/202,451

(22) Filed: May 26, 2023

(65) Prior Publication Data

US 2023/0415567 A1 Dec. 28, 2023

(30) Foreign Application Priority Data

Jun. 23, 2022 (JP) .................................. 2022-101225

(51) Int. Cl.
| | |
|---|---|
| B62D 49/06 | (2006.01) |
| B60K 17/10 | (2006.01) |
| B60K 17/28 | (2006.01) |
| B60R 16/08 | (2006.01) |
| H01H 27/06 | (2006.01) |

(52) U.S. Cl.
CPC .............. B60K 17/28 (2013.01); B60K 17/10 (2013.01); B60R 16/08 (2013.01); B62D 49/06 (2013.01); H01H 27/06 (2013.01)

(58) Field of Classification Search
CPC ........ B60K 17/10; B60K 17/28; B60R 16/08; B62D 49/06; H01H 27/06
See application file for complete search history.

(56) References Cited

U.S. PATENT DOCUMENTS

| | | | | |
|---|---|---|---|---|
| 7,163,077 B2 * | 1/2007 | Hasegawa | ............ | B60K 17/105 |
| | | | | 180/305 |
| 2021/0199138 A1 | 7/2021 | Okamoto et al. | | |

FOREIGN PATENT DOCUMENTS

| | | | | | |
|---|---|---|---|---|---|
| CN | 107869161 B | * | 5/2020 | ............. | B60K 17/02 |
| CN | 110159440 B | * | 12/2021 | ............ | B60W 20/40 |
| JP | 4337677 B2 | * | 9/2009 | | |
| JP | 2021-105426 A | | 7/2021 | | |
| WO | WO-2020179762 A1 | * | 9/2020 | | |

* cited by examiner

*Primary Examiner* — Faye M Fleming
(74) *Attorney, Agent, or Firm* — Keating & Bennett, LLP

(57) ABSTRACT

A work machine includes an engine, a hydraulic pump, a work apparatus driver to receive a pressurized fluid, a hydraulic circuit connecting the hydraulic pump with the work apparatus driver, a control valve in the hydraulic circuit, a relief valve connected to a first portion upstream of the control valve, a drain path connected to a second portion upstream of the first portion, an on-off valve to open and close the drain path, and a controller to control the on-off valve based on a state of the engine. The controller is configured or programmed to keep the on-off valve open after detecting an operation to start the engine until detecting a start of the engine and to close the on-off valve in response to detecting the start of the engine.

6 Claims, 7 Drawing Sheets

WORK MACHINE

CROSS REFERENCE TO RELATED APPLICATIONS

This application claims the benefit of priority to Japanese Patent Application No. 2022-101225 filed on Jun. 23, 2022. The entire contents of this application are hereby incorporated herein by reference.

BACKGROUND OF THE INVENTION

1. Field of the Invention

The present invention relates to a work machine.

2. Description of the Related Art

A work machine (tractor) disclosed in Japanese Patent Publication JP2021-105426A as an example includes a work apparatus drive unit (PTO clutch) to which a hydraulic fluid is supplied from a hydraulic pump, a hydraulic circuit (second oil circuit and second control oil circuit), a control valve (second control valve) and a relief valve (pressure adjustment valve). The hydraulic circuit connects the hydraulic pump with the work apparatus drive unit and supplies the hydraulic fluid from the hydraulic pump to the work apparatus drive unit. The control valve is disposed in the hydraulic circuit and controls the work apparatus drive unit. The relief valve is connected to a portion of the hydraulic circuit which portion is upstream of the control valve. The relief valve sets the pressure of the hydraulic fluid to be supplied to the work apparatus drive unit. In a case of the hydraulic pump configured to be driven by an engine in the work machine described above, the engine is loaded by the hydraulic pump which rotates with the engine when the engine is going to be started, making it hard to start the engine. In particular, the hydraulic pump which is trying to rotate is heavily loaded by the hydraulic fluid with a high viscosity when the hydraulic fluid is cold, such as in cold climates. This increases the load applied to the engine by the hydraulic pump and thus makes it hard to start the engine.

SUMMARY OF THE INVENTION

Preferred embodiments of the present invention provide work machines, each being able to easily start an engine even when a hydraulic pump is driven by the engine.

A work machine according to a preferred embodiment of the present invention includes an engine, a hydraulic pump drivable by the engine, a work apparatus driver to receive a pressurized fluid, a hydraulic circuit connecting the hydraulic pump with the work apparatus driver to supply the pressurized fluid from the hydraulic pump to the work apparatus driver, a control valve in the hydraulic circuit to control the work apparatus driver, a relief valve connected to a first portion of the hydraulic circuit upstream of the control valve to set a pressure of the pressurized fluid to be supplied to the work apparatus driver, a drain path connected to a second portion of the hydraulic circuit upstream of the first portion to discharge the pressurized fluid from the hydraulic circuit not through the relief valve, an on-off valve to open and close the drain path, and a controller to control the on-off valve based on a state of the engine, the controller being configured or programmed to keep the on-off valve open after detecting an operation to start the engine until detecting a start of the engine and to close the on-off valve in response to detecting the start of the engine.

According to this configuration, when an operation to start the engine is performed, the on-off valve is opened by the controller and the hydraulic circuit is opened by the drain path to allow the pressurized fluid to be discharged. This lightens the load by the pressurized fluid on the hydraulic pump which is trying to rotate with the engine compared to the case where the hydraulic circuit is left unopened, thus making it easier to start the engine. When the engine has started, the on-off valve is closed by the controller to prevent drainage of the pressurized fluid through the drain path of the hydraulic circuit. Therefore, it is possible to supply the pressurized fluid to the work apparatus driver with a pressure set by the relief valve which pressure required to operate the work apparatus driver.

A work machine according to a preferred embodiment of the present invention may include a starter to start the engine, and the controller is configured or programmed to detect the operation to start the engine based on a position of the starter.

According to this configuration, since the starter is used to detect the operation to start the engine, starting the engine is facilitated with an inexpensive configuration.

In a work machine according to a preferred embodiment of the present invention, the starter may include a key switch to switch the position of the starter to a power-on position for a power-on operation and to a starting position to activate the starter device, and the controller is configured or programmed to determine in response to detecting the key switch being switched to the power-on position that the operation to start the engine has been performed.

According to this configuration, when the hydraulic pump is going to rotate with the engine, the on-off valve is open and the pressurized fluid circuit is opened by the drain path. In other words, the hydraulic pump begins to rotate when the load on the hydraulic pump by the pressurized fluid is lightened. This makes it easier to start the engine.

In a work machine according to a preferred embodiment of the present invention, a rotational speed detector to detect a rotational speed of the engine, the controller is configured or programmed to determine in response to the rotational speed reaching an idling speed that the engine has started.

According to this configuration, when the engine has started and then reached the idling speed, the controller closes the on-off valve and prevents drainage of the pressurized fluid through the drain path of the hydraulic circuit. Therefore, it is possible to supply the pressurized fluid to the work apparatus driver with the pressure set by the relief valve which pressure is stably maintained.

A work machine according to a preferred embodiment of the present invention may also include a hydrostatic continuously variable transmission to vary a motive power from the engine and transmit the varied motive power to a travel device, and the pressurized fluid discharged from the relief valve is supplied as hydraulic fluid to the continuously variable transmission.

According to this configuration, the pressurized fluid discharged from the relief valve is supplied as the hydraulic fluid to the continuously variable transmission. Therefore, it is possible to use the pressurized fluid discharged from the relief valve without waste.

A work machine according to a preferred embodiment of the present invention may also include a valve assembly including the control valve, the relief valve and the on-off valve, and the drain path is connected to the second portion of the hydraulic circuit in the valve assembly.

According to this configuration, it is possible to assemble the control valve, the relief valve, and the on-off valve together by assembling the valve assembly. This facilitates assembly of the control valve, the relief valve, and the on-off valve.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
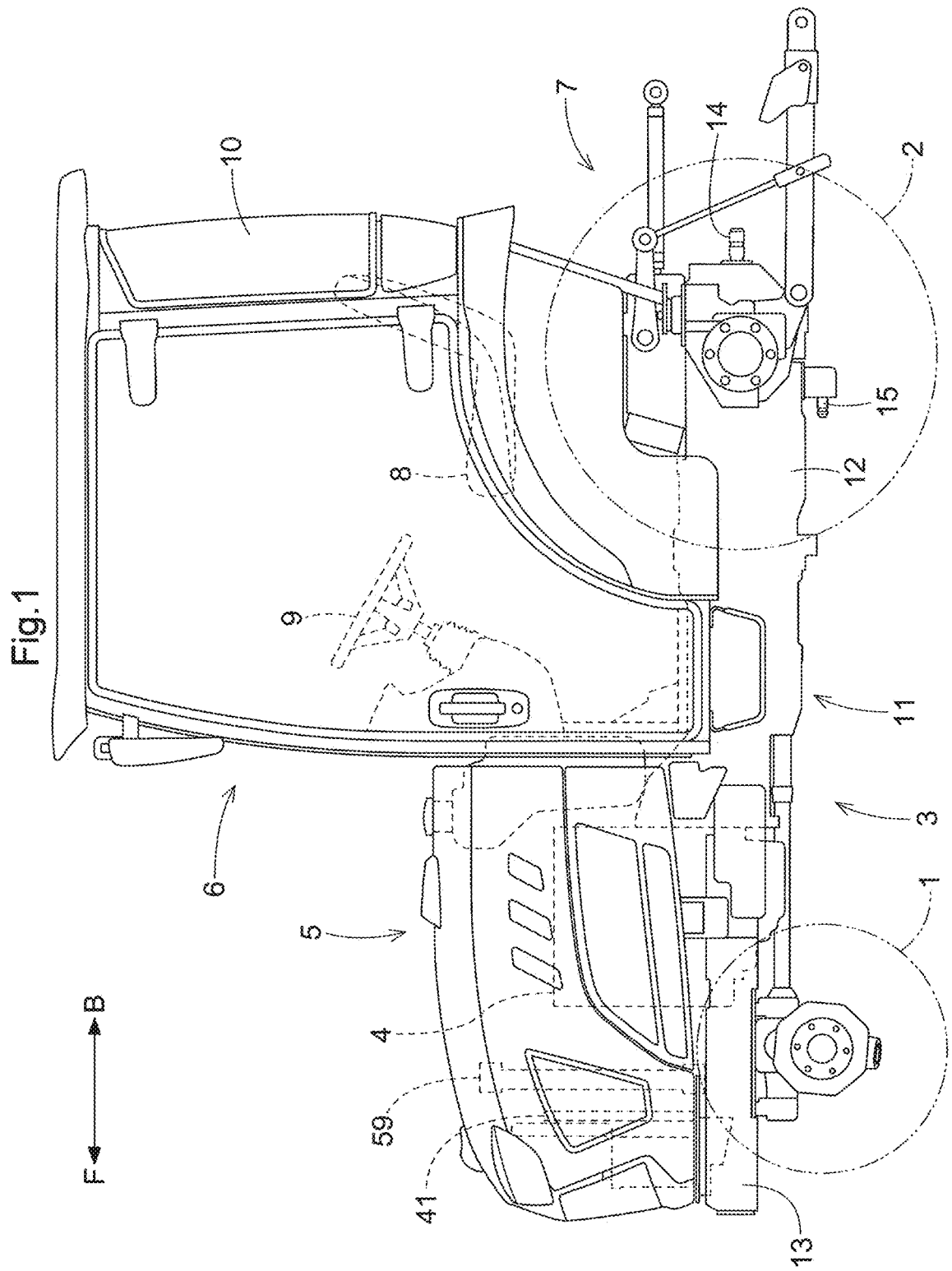
FIG. 1 is a side view of a tractor.
Figure 2:
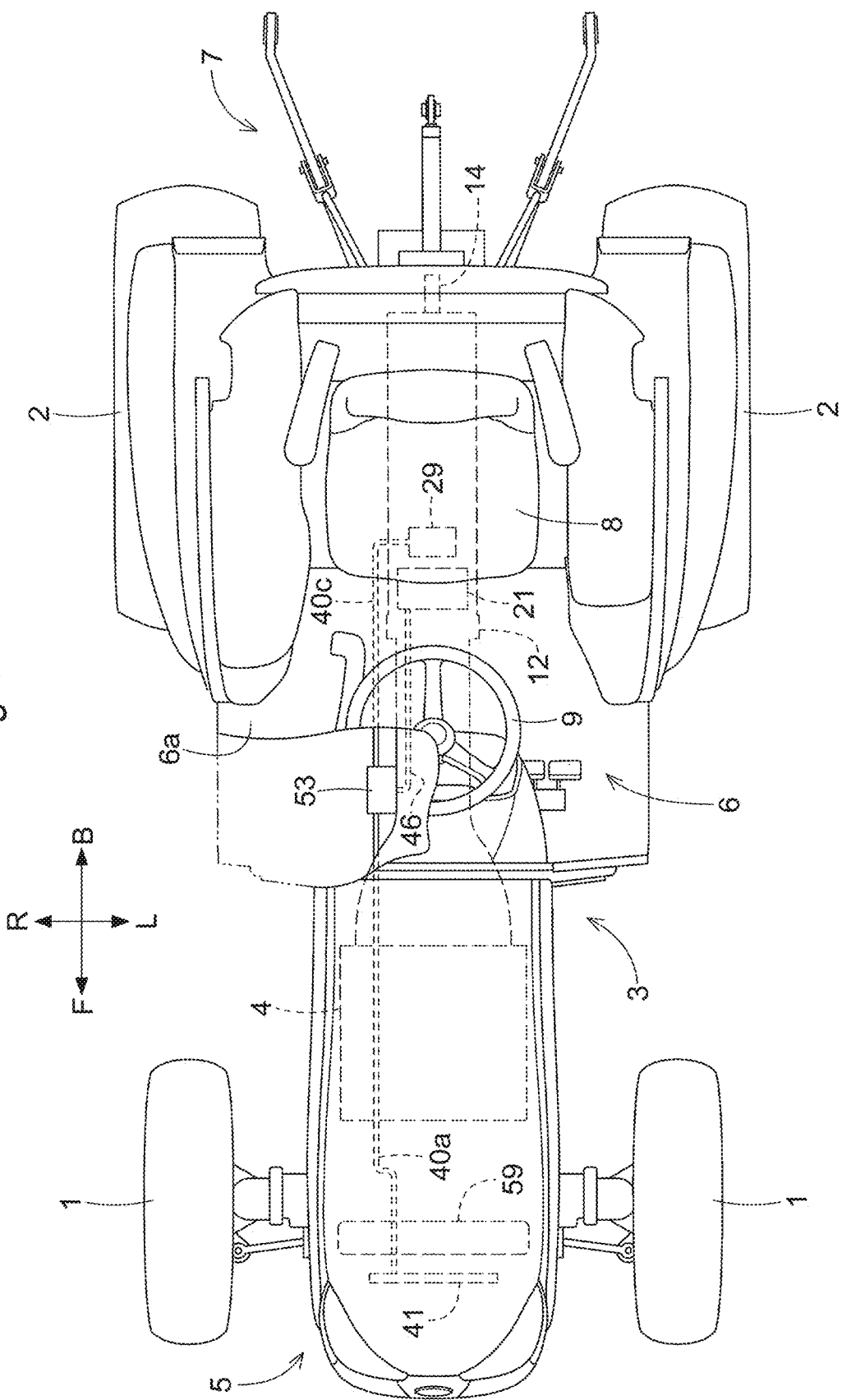
FIG. 2 is a plan view of the tractor in which a cabin is removed and a floor of a driver section is partly cut away.
Figure 3:
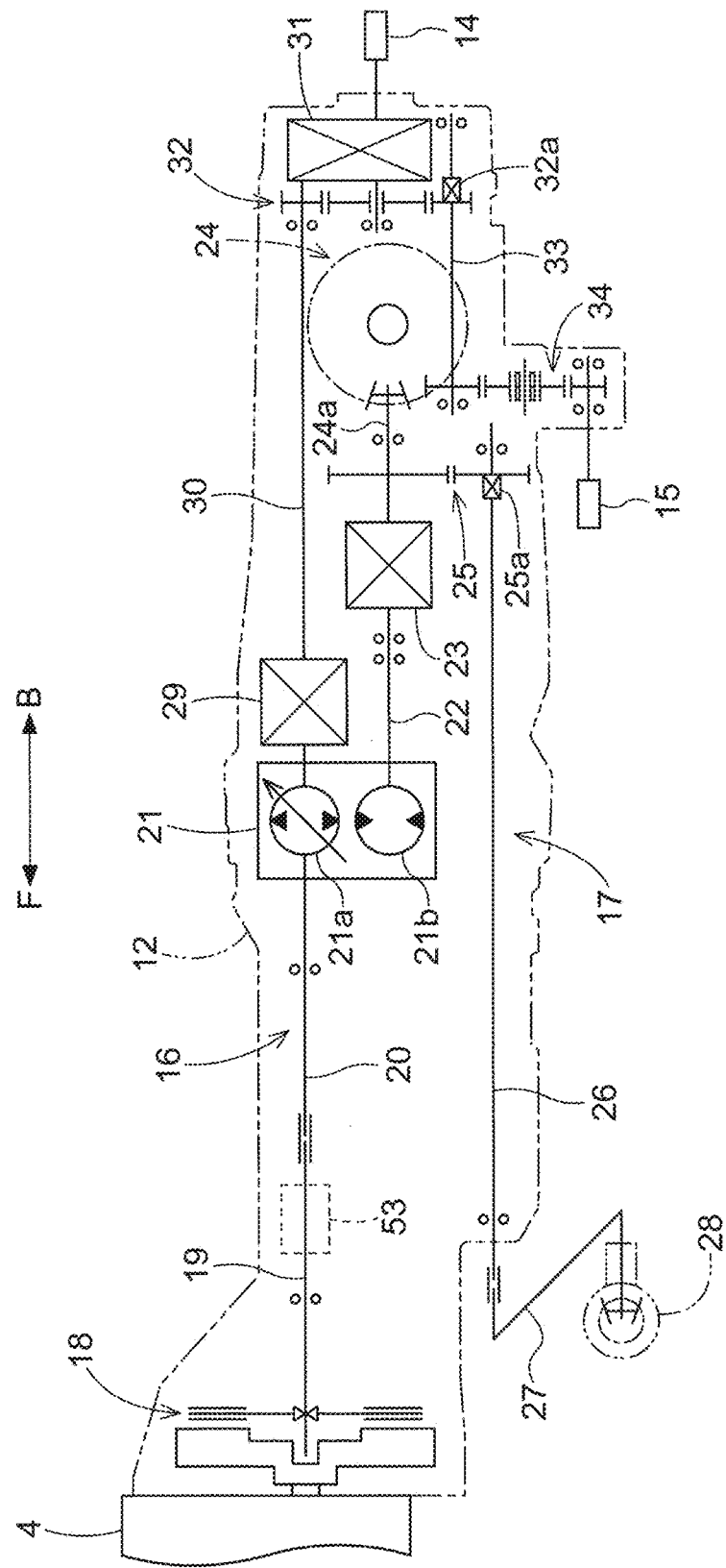
FIG. 3 is a side view of a motive power transmission.

Preferred embodiments of the present invention will be described with reference to the drawings showing a tractor as an example of a work machine. Throughout the description of the preferred embodiments, front and back directions of the work machine are defined to correspond to travelling directions of a body of the work machine in a work state. Left and right directions of the work machine are defined to correspond to directions as seen from an operator in a driver section. That is, an "F" arrow as shown in FIGS. 1 to 3 indicates a front side of the body, a "B" arrow as shown in FIGS. 1 to 3 indicates a back side of the body, an "L" arrow as shown in FIG. 2 indicates a left side of the body and an "R" arrow as shown in FIG. 2 indicates a right side of the body. Therefore, the left-right direction of the body corresponds to the width direction of the body.

FIGS. 1 and 2 show a tractor. The tractor includes left and right front wheels 1 (travel device) which are steerable and drivable, left and right rear wheels 2 (travel device) which are drivable and a body 3 which is supported by the front wheels 1 and the rear wheels 2. A driving unit 5 including an engine 4 is disposed in a front portion of the body 3. A driver section 6 and a link mechanism 7 are disposed in a rear portion of the body 3. An operator boards the driver section 6 and performs a driving operation. The link mechanism 7 connects with a work apparatus such as a rotary cultivator and enables a raising operation and a lowering operation of the work apparatus. The driver section 6 includes a driver seat 8, a steering wheel 9 with which the operator operates a steering of the front wheels 1, and a cabin 10 which covers a boarding space thereof. A body frame 11 of the body 3 includes the engine 4, a transmission case 12, and a front support frame 13 which holds the front wheels 1. A front portion of the transmission case 12 is connected to a rear portion of the engine 4. The front support frame 13 is connected to a bottom portion of the engine 4. A rear PTO shaft 14 which transmits a motive power from the engine 4 to the work apparatus connected by the link mechanism 7 is disposed in a rear portion of the transmission case 12. A mid PTO shaft 15 which transmits the motive power from the engine 4 to a work apparatus is disposed below the transmission case 12, the work apparatus like a mower, etc. being connected to a bottom portion of the body 3. Note that the cabin 10 is omitted for convenience in FIG. 2.

FIG. 3 shows a configuration of a power transmission 16 for travelling and a power transmission 17 for work. The power transmission 16 transmits the motive power from the engine 4 to the front wheels 1 and the rear wheels 2. The power transmission 17 transmits the motive power from the engine 4 to the rear PTO shaft 14 and mid PTO shaft 15. The power transmission 16 and the power transmission 17 are disposed in the transmission case 12.

The power transmission 16 for travelling includes a continuously variable transmission 21, a gear transmission 23, a rear wheels differential mechanism 24, and a front wheels output shaft 26. The output of the engine 4 is input to the continuously variable transmission 21 via a main clutch 18, a first drive shaft 19, and a second drive shaft 20 to which a rear portion of the first drive shaft 19 is connected at a front portion thereof. The continuously variable transmission 21 varies the motive power input thereto and transmits the varied motive power to the front wheels 1 and rear wheels 2. The output of the continuously variable transmission 21 is input to the gear transmission 23 via a rotating shaft 22. The output of the gear transmission 23 is input to the rear wheels differential mechanism 24 via an input shaft 24a. The rear wheels differential mechanism 24 outputs the motive power input thereto to the left and right rear wheels 2. The motive power of the input shaft 24a is transmitted to the front wheels output shaft 26 via a gear linkage mechanism 25. The continuously variable transmission 21 includes a variable displacement hydraulic pump 21a and a hydraulic motor 21b. The motive power of the second drive shaft 20 is input to the hydraulic pump 21a. The hydraulic motor 21b is driven by hydraulic fluid from hydraulic pump 21a and outputs the motive power to the rotating shaft 22. The continuously variable transmission 21 is a hydrostatic stepless transmission. A clutch 25a is disposed between the gear linkage mechanism 25 and the front wheels output shaft 26. The clutch 25a turns on and off a power transmission from the gear linkage mechanism 25 to the front wheels output shaft 26. The motive power of the front wheels output shaft 26 is transmitted to a front wheels differential mechanism 28 via a rotating shaft 27.

The power transmission 17 for work includes a PTO clutch 29 as a work apparatus driver, a PTO transmission 31, a relay transmission shaft 33, and a second gear linkage mechanism 34. The motive power of the second drive shaft 20 is input to the PTO clutch 29 via a pump shaft of the hydraulic pump 21a. The output of the PTO clutch 29 is input to the PTO transmission 31 via a rotary shaft 30. The PTO transmission 31 varies the motive power input thereto and outputs the varied motive power to the rear PTO shaft 14. The motive power of the rotary shaft 30 is transmitted to the relay transmission shaft 33 via a first gear linkage mechanism 32. The second gear linkage mechanism 34 transmits the motive power of the relay transmission shaft 33 to the mid PTO shaft 15. The motive power from the engine 4 is transmitted to the rear PTO shaft 14 by turning the PTO clutch 29 "ON". A power transmission to the rear PTO shaft 14 is cut off, by turning the PTO clutch 29 "OFF". A mid PTO clutch 32a is disposed between the first gear linkage mechanism 32 and the relay transmission shaft 33. The motive power from the engine 4 is transmitted to the mid PTO shaft 15 by turning the mid PTO clutch 32a "ON".

A power transmission to the mid PTO shaft 15 is cut off by turning the mid PTO clutch 32a "OFF".

Figure 4:
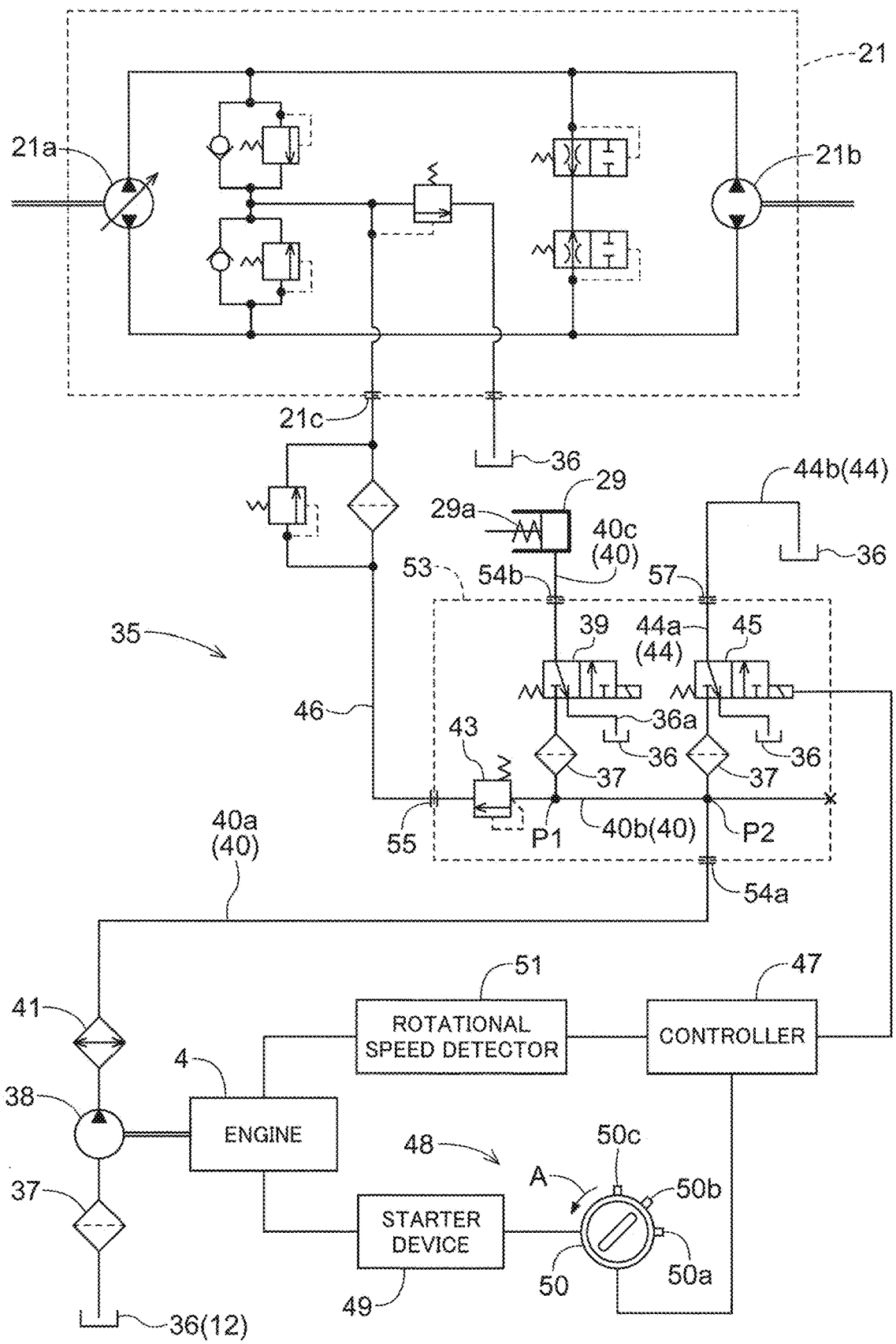
FIG. 4 is a hydraulic circuit diagram.

The PTO clutch 29 preferably is a hydraulically operable clutch, for example. When pressurized fluid is supplied, the PTO clutch 29 is turned "ON". When the pressurized fluid is discharged, the PTO clutch 29 is turned "OFF" by a spring 29a (see FIG. 4). FIG. 4 shows a configuration of an operation apparatus 35 and a hydraulic circuit which configuration enables an operation of the PTO clutch 29.

As shown in FIG. 4, the operation apparatus 35 includes a hydraulic pump 38 drivable by the engine 4. The hydraulic pump 38 draws hydraulic fluid from a hydraulic fluid tank 36 through a filter 37, compresses the extracted hydraulic fluid, and discharges the pressurized fluid. The hydraulic pump 38 and the PTO clutch 29 are connected to each other by a hydraulic circuit 40. The pressurized fluid from the hydraulic pump 38 is supplied to the PTO clutch 29 as an operating fluid by the hydraulic circuit 40. A control valve 39 is disposed in the hydraulic circuit 40 to control the PTO clutch 29. The control valve 39 supplies the pressurized fluid to the PTO clutch 29 to turn the PTO clutch 29 "ON" when the control valve 39 is operated in an ON position. The control valve 39 discharges the pressurized fluid from the PTO clutch 29 to turn the PTO clutch 29 "OFF" when the control valve 39 is operated in an OFF position. The hydraulic circuit 40 includes a pump-side path portion 40a, an inside path portion 40b in the unit, and a clutch-side path portion 40c. The pump-side path portion 40a connects an input port 54a of a valve unit 53 with the hydraulic pump 38. The inside path portion 40b is in the valve unit 53. The clutch-side path portion 40c connects an output port 54b of the valve unit 53 with the PTO clutch 29. The valve unit 53 includes the control valve 39. An oil cooler 41 is disposed in the pump-side path portion 40a.

A relief valve 43 is connected to a first portion P1 of the hydraulic circuit 40 which first portion P1 is upstream of the control valve 39. The relief valve 43 sets the pressure of the pressurized fluid to be supplied to the PTO clutch 29. A drain path 44 is connected to a second portion P2 of the hydraulic circuit 40 which second portion P2 is upstream of the control valve 39 and the first portion P1 where the relief valve 43 is connected to. The drain path 44 is opened and closed by an on-off valve 45. When the on-off valve 45 is opened, the pressurized fluid in the hydraulic circuit 40 is drained by the drain path 44 not through the relief valve 43. When the on-off valve 45 is closed, drainage of the pressurized fluid through the drain path 44 of the hydraulic circuit 40 is prevented. The drain path 44 includes an inside path portion 44a and a tank-side path portion 44b. The inside path portion 44a is in the valve unit 53. The tank-side path portion 44b connects a drain port 57 of the valve unit 53 to the hydraulic fluid tank 36. The on-off valve 45 is disposed in the inside path portion 44a in the valve unit 53. A discharge port 55 of the valve unit 53 and a charge port 21c of the continuously variable transmission 21 are connected to each other by a supply path 46. The pressurized fluid discharged from the relief valve 43 is supplied as a hydraulic fluid to the continuously variable transmission 21 by the supply path 46. In this preferred embodiment, the hydraulic fluid tank 36 includes the transmission case 12, and the lubricating fluid stored in the transmission case 12 is used as the pressurized fluid for the PTO clutch 29 and the hydraulic fluid for the continuously variable transmission 21. The hydraulic pump 38 preferably is a gear pump, for example.

When the on-off valve 45 is closed, discharge of the pressurized fluid from the hydraulic circuit 40 to the drain path 44 is prevented and pressurized fluid from the hydraulic pump 38 is supplied to the control valve 39. A pressure of the pressurized fluid required to operate the PTO clutch 29 is set by the relief valve 43. When the control valve 39 is switched to the ON position, the pressurized fluid with the pressure required to operate the PTO clutch 29 is supplied from the control valve 39 to the PTO clutch 29 to turn the PTO clutch 29 "ON". When the control valve 39 is switched to the OFF position, the pressurized fluid supplied to the PTO clutch 29 is discharged to the hydraulic fluid tank 36 through the control valve 39 and a drain path 36a to turn the PTO clutch 29 "OFF". When the pressurized fluid is discharged from the relief valve 43, the discharged fluid is supplied as a hydraulic fluid to the continuously variable transmission 21 by the supply path 46.

As shown in FIG. 4, a controller 47 links to the on-off valve 45 to control the on-off valve 45 based on a state of the engine 4. The on-off valve 45 is a solenoid-operated valve. The controller 47 links to the on-off valve 45 so that the controller 47 is able to output electrical signals to the on-off valve 45. The controller 47 is configured or programmed to keep the on-off valve 45 open after detecting an operation to start the engine 4 until detecting a start of the engine 4, and to close the on-off valve 45 in response to detecting the start of the engine 4. In other words, when the engine 4 is operated to start, the on-off valve 45 is opened by the controller 47 to allow drainage of the fluid in the hydraulic circuit 40 through the drain path 44. This lightens the load by the fluid on the hydraulic pump 38 which is trying to rotate with the engine 4, compared to the case where the fluid in the hydraulic circuit 40 is not drained through the drain path 44. When the engine 4 has started, the on-off valve 45 is closed by the controller 47 to prevent drainage of the pressurized fluid through the drain path 44 of the hydraulic circuit 40. Therefore, it is possible to supply the pressurized fluid to the PTO clutch 29 with a pressure set by the relief valve 43 which pressure required to operate the PTO clutch 29.

As shown in FIG. 4, the controller 47 links to a starter 48 and a rotational speed detector 51. The starter 48 is an apparatus to start the engine 4. The rotational speed detector 51 includes a mechanism to detect the rotational speed of the engine 4. The controller 47 is configured or programmed to detect the operation to start the engine 4 based on the position of the starter 48 and to determine whether the engine 4 has started or not based on the detection result by the rotational speed detector 51.

Specifically, the starter 48 includes a starter device 49 and a key switch 50. The starter device 49 is configured to start the engine 4 with a starter motor (not shown). The key switch 50 links to the starter device 49. The key switch 50 has three positions: a key removal position 50a for removing and inserting a key (not shown), a power-on position 50b for turning "ON" a power to the starter device 49, etc., and a starting position 50c for activating the starter device 49. As shown in FIG. 4, the key removal position 50a and the power-on position 50b are located adjacent to each other. Also, the starting position 50c is located adjacent to the power-on position 50b and on the opposite side to the key removal position 50a across the power-on position 50b. In the key switch 50, when the key inserted in the key removal position 50a is rotated in the direction indicated by arrow A from the key removal position 50a to the power-on position 50b, the power of the starter device 49, etc. is switched from "OFF" to "ON", and then when the key is further moved from the power-on position 50b to the starting position 50c, the starter device 49 is activated.

The controller 47 is configured or programmed to determine that the operation to start the engine 4 has been performed, when detecting the key switch 50 being switched from the key removal position 50a to the power-on position 50b based on an information from the key switch 50, and then to operate the on-off valve 45 to be opened.

The controller 47 is configured or programmed to determine that the engine 4 has started when the rotational speed of the engine 4 reaches an idling speed based on a detection result of the rotational speed detector 51, and then to operate the on-off valve 45 to be closed.

Figure 5:
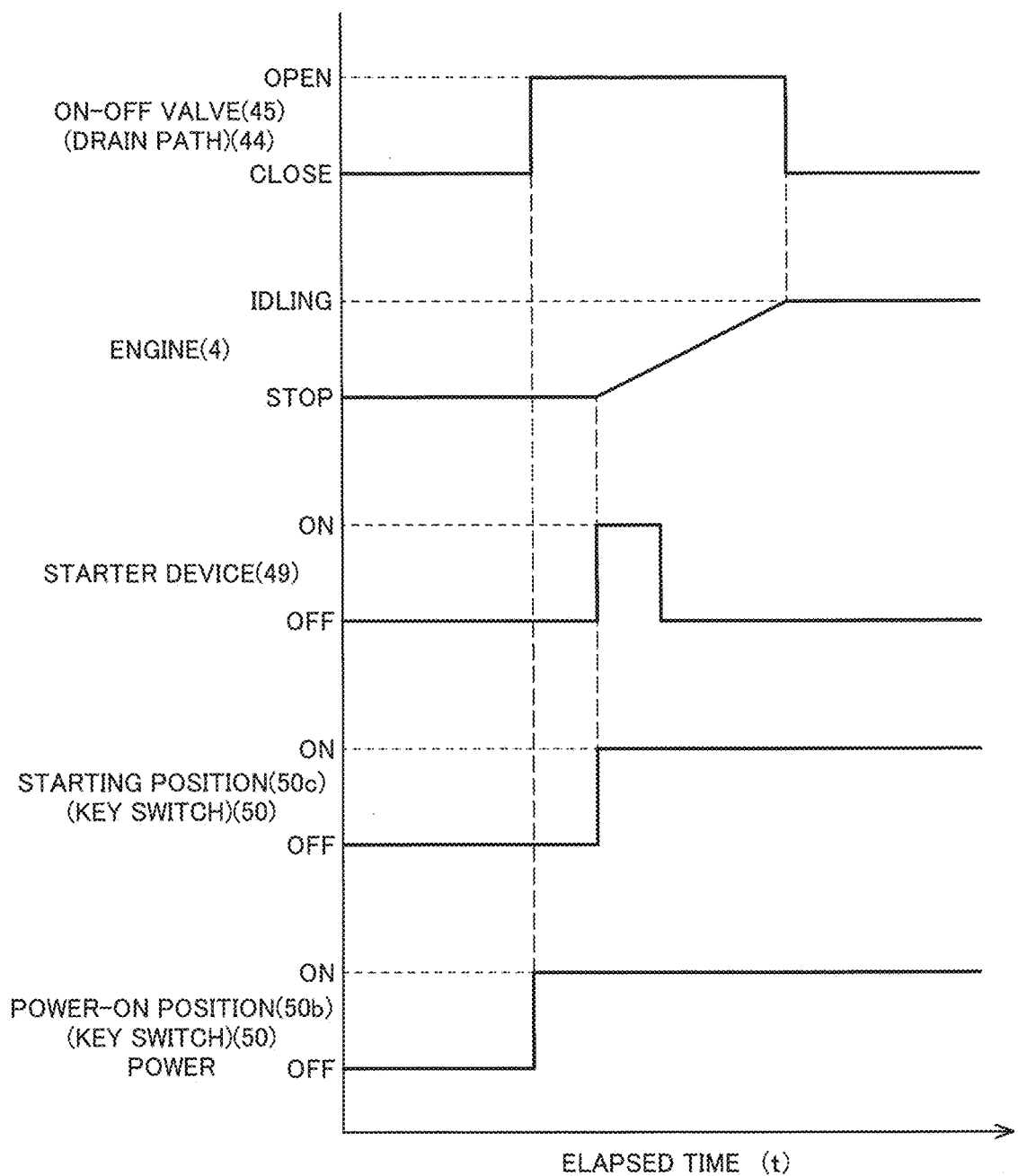
FIG. 5 is an explanatory diagram showing changes with time of a key switch, a power supply, a starter device, an engine and an on-off valve.

FIG. 5 shows changes with time of the key switch 50, the power supply, the starter device 49, the engine 4 and the on-off valve 45. The horizontal axis in FIG. 5 shows the elapsed time t. As shown in FIG. 5, when the key switch 50 is turned to the power-on position 50b and the power is turned "ON", the controller 47 operates the on-off valve 45 to open the drain path 44. When the key switch 50 is switched from the power-on position 50b to the starting position 50c, the starter device 49 is operated to be turned "ON" to start the engine 4. When the engine 4 has started, the starter device 49 returns to "OFF". When the engine 4 has started and the rotational speed of the engine 4 has been accelerated to the idling speed (an idling drive condition of the engine 4), the on-off valve 45 is operated to be closed by the controller 47 and the drain path 44 is returned to be closed.

Figure 6:
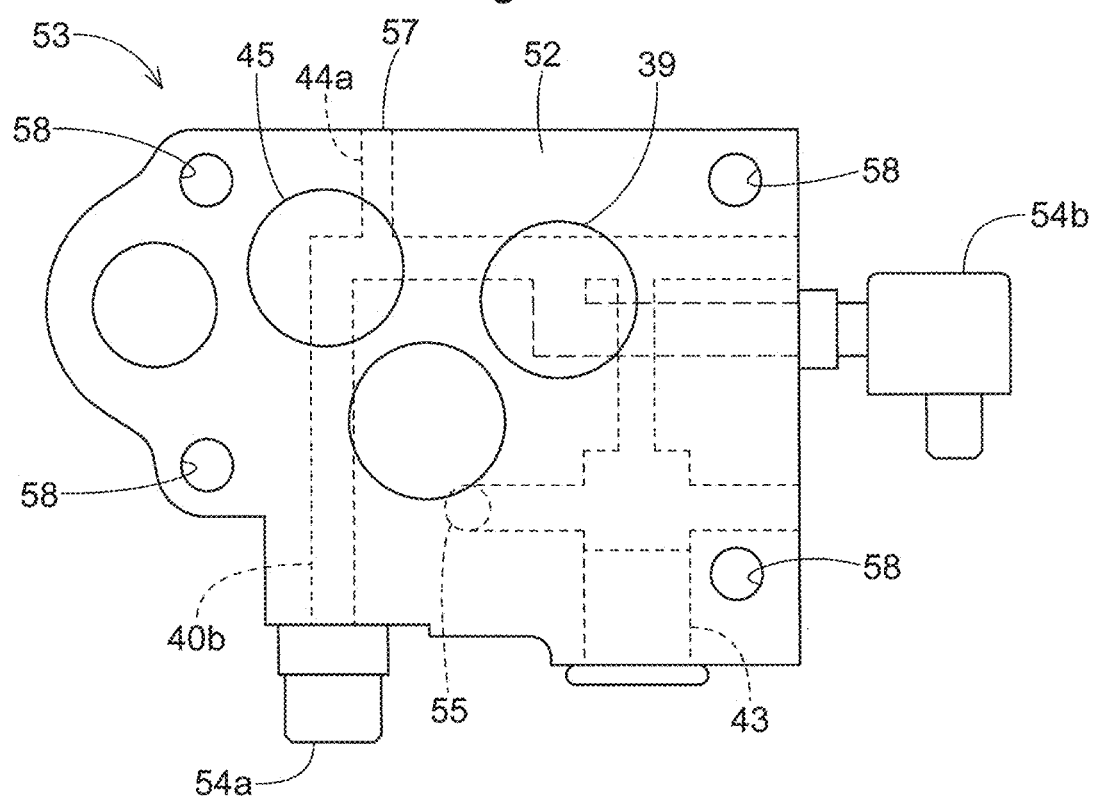
FIG. 6 is a side view of a valve unit.

FIGS. 4 and 6 show a configuration of the valve unit 53 including the control valve 39, the relief valve 43 and the on-off valve 45 which are inside the same valve housing 52. As shown in FIG. 4, in the valve unit 53, the inside path portion 44a of the drain path 44 is connected to the second portion P2 upstream of the control valve 39 and the relief valve 43 in the inside path portion 40b of the hydraulic circuit 40. The input port 54a is located at a lower portion of the valve housing 52 to input the pressurized fluid from the hydraulic pump 38. The discharge port 55 to which the supply path 46 is connected is located at a lateral side portion of the valve housing 52. The output port 54b to which the clutch-side path portion 40c of the hydraulic circuit 40 is connected is located at a rear portion of the valve housing 52. The drain port 57 is located at a top portion of the valve housing 52. The tank-side path portion 44b of the drain path 44 is connected to the drain port 57.

As shown in FIGS. 2 and 3, the valve unit 53 is fixed to a lateral side portion of the transmission case 12 and is disposed below a floor 6a of the driver section 6 and between the front wheels 1 and the rear wheels 2. As shown in FIG. 6, four mounting holes 58 are provided in the valve housing 52. Connecting bolts (not shown) are inserted into each of the mounting holes 58 to engage with the transmission case 12. As a result, the valve unit 53 is fixed to the transmission case 12. The oil cooler 41 is disposed in the engine compartment at a portion forward of a radiator 59 for the engine 4.

As shown in FIG. 2, the clutch-side path portion 40c which connects the output port 54b of the valve unit 53 with the PTO clutch 29 extends in the front-rear direction of the body 3 outside the transmission case 12. The pump-side path portion 40a which connects the oil cooler 41 with the input port 54a of the valve unit 53 extends in the front-rear direction of the body 3 below the engine 4. The supply path 46 which connects the discharge port 55 of the valve unit 53 to the charge port 21c of the continuously variable transmission 21 extends in the front-rear direction of the body 3 inside the transmission case 12.

Other Preferred Embodiments

The present invention is not limited to the configuration illustrated in the above preferred embodiments. Other representative preferred embodiments of the present invention will be described below.

Figure 7:
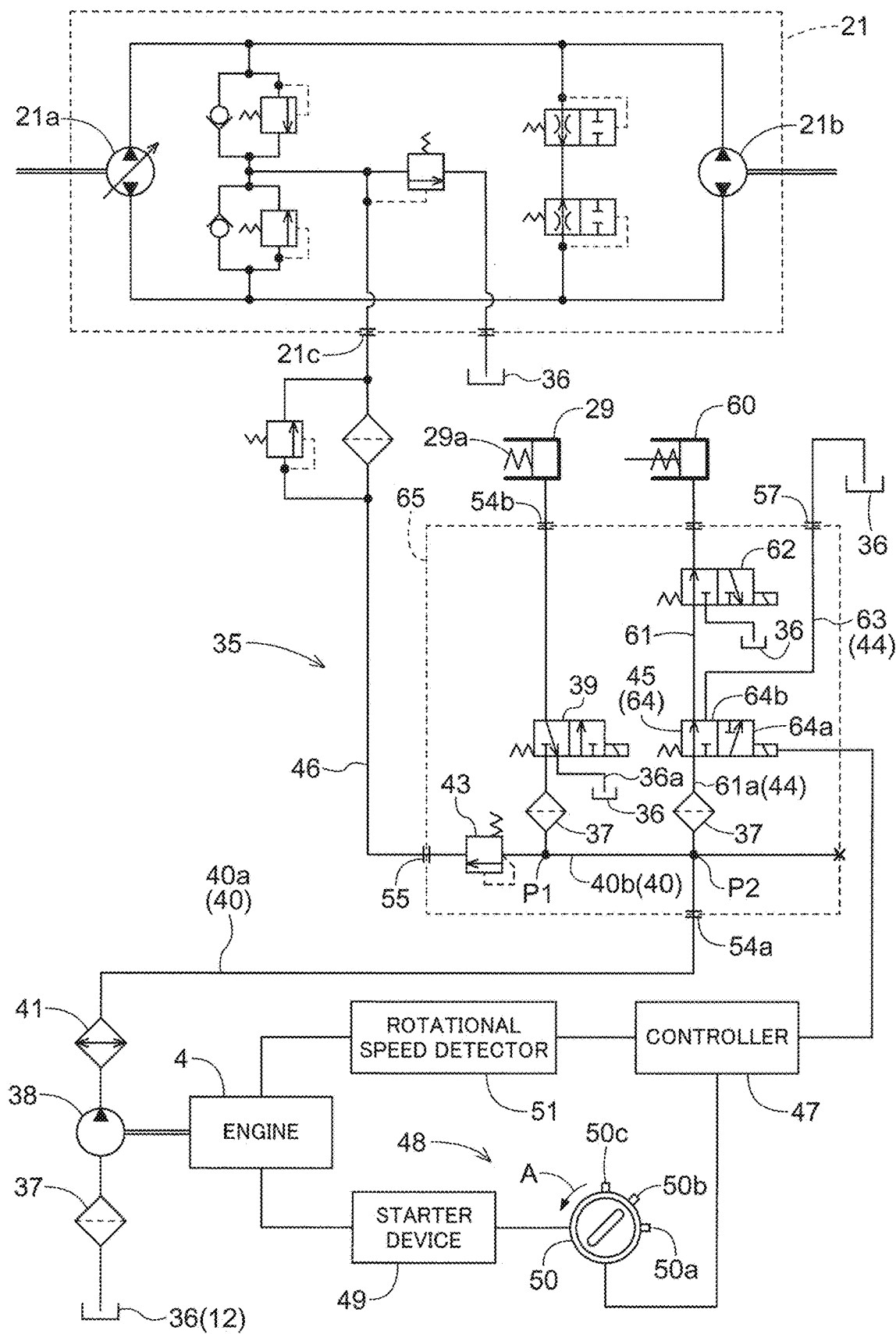
FIG. 7 is a hydraulic circuit diagram according to second preferred embodiment of the present invention.

(1) FIG. 7 shows a hydraulic circuit of the work machine as another preferred embodiment of the present invention. The work machine in accordance with the another preferred embodiment has a front wheel accelerator (not shown) which accelerates a drive speed of the front wheels 1 over that of the rear wheels 2, and a front wheel acceleration clutch 60 switchable to activate the front wheel accelerator. In the hydraulic circuit of the another preferred embodiment, a clutch operation fluid path 61 is provided to connect the front wheel acceleration clutch 60 with the second portion P2 upstream of the control valve 39 and upstream of the first portion P1 where the relief valve 43 is connected, in the hydraulic circuit 40, and to supply the pressurized fluid from the hydraulic pump 38 to the front wheel acceleration clutch 60. A clutch control valve 62 is disposed in the clutch operation fluid path 61 to perform on-off control of the front wheel acceleration clutch 60.

A flow path switching valve 64 is disposed in the clutch operation fluid path 61 upstream of the clutch control valve 62, and a tank-side drain path 63 is connected to the flow path switching valve 64. The flow path switching valve 64 is switchable between a first operating position 64a and a second operating position 64b, the first operating position 64a closing the clutch operation fluid path 61 and connecting a fluid path 61a upstream of the flow path switching valve 64 with the tank-side drain path 63, the second operating position 64b opening the clutch operation fluid path 61 and disconnecting the fluid path 61a from the tank-side drain path 63.

In other words, the drain path 44 is connected to the second portion P2 of the hydraulic circuit 40 and is configured to drain the pressurized fluid from the hydraulic circuit 40 not through the relief valve 43 but through the fluid path 61a of the clutch operation fluid path 61 and the tank-side drain path 63, the second portion P2 being upstream of the control valve 39 and the first portion P1 where the relief valve 43 is connected to. The on-off valve 45 which is controlled by controller 47 to open and close the drain path 44 is preferably defined by the flow path switching valve 64, for example.

The clutch control valve 62, the flow path switching valve 64, the control valve 39, and the relief valve 43 are disposed in one valve housing (not shown) and define a valve unit 65 (valve assembly). Alternatively, the clutch control valve 62, the flow path switching valve 64, the control valve 39, and the relief valve 43 may be disposed in separate valve housings and not define a valve unit.

(2) In the above-described preferred embodiment, the PTO clutch 29 is provided as an example of the work apparatus driver. The work apparatus driver is not limited to the PTO clutch, and various devices can be used to drive the work apparatus, such as a speed changer operated by a hydraulically operated clutch to change drive speed of the work apparatus.

(3) The above-described preferred embodiment shows an example in which the detection of the operation to start the engine 4 is based on the operating position of the key switch 50 of the starter 48. Alternatively, the detection of the operation to start the engine 4 may be based on the state of the starter device 49 of the starter 48, or on a detection result of the speed detection mechanism to detect the rotational speed of the engine 4.

(4) The above-described preferred embodiment shows an example in which the detection of the start of the engine 4 is based on the engine 4 having reached the idling state. Alternatively, the detection of the start of the engine 4 may be based on the engine 4 having reached a rotational speed lower than the idling state.

(5) The above-described preferred embodiment shows an example in which the control valve 39, the relief valve 43, and the on-off valve 45 are provided in the valve unit 53. Alternatively, the control valve 39, the relief valve 43, and the on-off valve 45 may be disposed in separate valve housings.

(6) In the above-described preferred embodiment, the front wheels 1 and the rear wheels 2 are provided as an example of the travel device. Alternatively, a crawler travel device or mini crawler travel device may be used as the travel device.

Note that the configuration disclosed in the above preferred embodiments (including other preferred embodiments; the same applies to the following) may be combined with configurations disclosed in other preferred embodiments, as long as no contradiction arises. The preferred embodiments disclosed herein are illustrative. Preferred embodiments of the present invention are not limited thereto, and can be altered without departing from the object of the present invention.

Preferred embodiments of the present invention and combinations or modifications thereof are applicable to a work machine including a hydraulic pump drivable by an engine and a work apparatus driver to receive a pressurized fluid from the hydraulic pump.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work machine, comprising:
    an engine;
    a hydraulic pump drivable by the engine;
    a work apparatus driver to receive pressurized fluid;
    a hydraulic circuit connecting the hydraulic pump with the work apparatus driver to supply the pressurized fluid from the hydraulic pump to the work apparatus driver;
    a control valve located in the hydraulic circuit to control the work apparatus driver;
    a relief valve connected to a first portion of the hydraulic circuit upstream of the control valve to set a pressure of the pressurized fluid to be supplied to the work apparatus driver;
    a drain path connected to a second portion of the hydraulic circuit upstream of the first portion to discharge the pressurized fluid from the hydraulic circuit not through the relief valve;
    an on-off valve to open and close the drain path; and
    a controller to control the on-off valve based on a state of the engine, the controller being configured or programmed to keep the on-off valve open after detecting an operation to start the engine until detecting a start of the engine and configured to close the on-off valve in response to detecting the start of the engine.

2. The work machine according to claim 1, further comprising
    a starter to start the engine; wherein
    the controller is configured or programmed to detect the operation to start the engine based on a position of the starter.

3. The work machine according to claim 2, wherein
    the starter includes a key switch to switch the position of the starter to a power-on position for a power-on operation and to a starting position for activating the starter; and
    the controller is configured or programmed to determine in response to detecting the key switch being switched to the second position that the operation to start the engine has been performed.

4. The work machine according to claim 1, further comprising:
    a rotational speed detector to detect a rotational speed of the engine; wherein
    the controller is configured or programmed to determine in response to the rotational speed reaching an idling speed that the engine has started.

5. The work machine according to claim 1, further comprising:
    a travel device; and
    a hydrostatic continuously variable transmission to vary a motive power from the engine and transmit the varied motive power to the travel device; wherein
    the pressurized fluid discharged from the relief valve is supplied as hydraulic fluid to the continuously variable transmission.

6. The work machine according to claim 1, further comprising:
    a valve assembly including the control valve, the relief valve and the on-off valve; wherein
    the drain path is connected to the second portion of the hydraulic circuit in the valve assembly.

* * * * *